United States Patent [19]

Paz et al.

[11] 4,154,020

[45] May 15, 1979

[54] PROCESS FOR THE PROPAGATION OF ROSE PLANTS

[76] Inventors: Uriel Paz; Moshe Levy; Zwy Levy, all of A. L. Nursery Ltd., Havazelet Hasharon 42937, Israel

[21] Appl. No.: 897,149

[22] Filed: Apr. 17, 1978

[30] Foreign Application Priority Data

Apr. 25, 1977 [IL] Israel ..................................... 51940

[51] Int. Cl.² .............................................. A01G 1/00
[52] U.S. Cl. ............................................ 47/6; 47/58; 47/DIG. 3
[58] Field of Search ........................................ 47/6–7, 47/58, DIG. 3

[56] References Cited

U.S. PATENT DOCUMENTS

| | | | |
|---|---|---|---|
| 3,500,582 | 3/1970 | Hyde | 47/6 |
| 3,574,970 | 4/1971 | Geytenbeek | 47/7 |
| 4,012,866 | 3/1977 | Brokaw | 47/6 |

*Primary Examiner*—Robert E. Bagwill
*Attorney, Agent, or Firm*—Burns, Doane, Swecker & Mathis

[57] ABSTRACT

An improved rose plant propagation process which can be carried out on an expeditious basis is provided. Stem segments from a scion rose plant and an understock rose plant are obtained during an active stage of growth. An end of a scion segment is placed into a cut formed in an understock segment, and an end portion of the understock segment is placed in a rooting medium. Roots simultaneously are formed on the understock segment while a graft union between the scion and understock rose plant stem segments is formed. The portion of the understock stem above the graft union next is removed. The process of the present invention offers a reliable rose plant propagation technique not heretofore available to the rose industry whereby quality new rose plants readily can be formed on an economical basis in a significantly shorter period of time than commonly required for prior rose plant propagation techniques.

10 Claims, 9 Drawing Figures

4,154,020

PROCESS FOR THE PROPAGATION OF ROSE PLANTS

BACKGROUND OF THE INVENTION

It is well known to those skilled in the propagation of rose plants that rose plants intended for commercial use are not grown on their own roots, but rather are grafted or budded onto an appropriate understock. For instance, a scion usually in a vegetatively active stage is commonly grafted onto a dormant understock which is either a one-year seedling or a previously rooted cutting. Such understocks are selected because they are agronomically adapted to provide good mechanical support and to efficiently carry out the specialized radicular function. Accordingly, those rose plants commonly encountered are composed of a scion of the desired variety which is united to a suitable understock.

Rose understocks, such as Rosa indica Major (commonly referred to as Rosa odorata in the United States), are of considerable economic importance and have been used in the production of rose plants to produce cut-flower roses. Such understocks possess the ability to increase cut-flower productivity, especially in the winter, and to assist in the adaptation of the scion varieties to difficult soil conditions (e.g. chemical conditions and/or dampness).

It is recognized, however, that it often is difficult to obtain on a reliable and efficient basis a successful graft between the scion variety and the understock. Such difficulty has reduced the number of resulting marketable plants and has substantially increased the cost of rose propagation in accordance with prior techniques. Some understocks, such as Rosa indica Major, have proven to be particularly difficult to graft successfully. Also, when budding has been selected as the rose plant propagation mode, it has commonly required a relatively long cycle (e.g. 9 to 18 months) of open air culture with concomitant relatively large space requirements.

It is an object of the present invention to provide an improved process for the propagation of rose plants.

It is an object of the present invention to provide an improved process for the propagation of rose plants which can be reliably carried out on an economical basis while requiring less space than commonly required by prior art techniques.

It is an object of the present invention to provide an improved process for the propagation of rose plants which can be carried out in a shorter period of time than that commonly consumed by prior rose propagation techniques.

It is an object of the present invention to provide an improved process for the propagation of rose plants which successfully can utilize a wide range of understocks including understocks which commonly are particularly difficult to graft, such as Rosa indica Major.

It is another object of the present invention to provide an improved process for the propagation of rose plants which can be successfully carried out by personnel possessing a minimal level of rose plant propagation skill.

These and other objects, as well as the scope, nature, and utilization of the claimed process will be apparent to those skilled in the art from the following detailed description and appended claims.

SUMMARY OF THE INVENTION

It has been found that an improved rose plant propagation process which can be carried out on an expeditious basis comprises:

(a) providing a segment of a scion rose plant stem having at least one bud and at least one leaflet which was obtained during an active stage growth, (b) providing a non-rooted segment of an understock rose plant stem having at least one leaflet which was obtained during an active stage of growth, (c) placing an end of the segment of scion rose plant stem into a cut formed in the non-rooted segment of understock rose plant stem at a location below the at least one leaflet, (d) placing an end portion of the resulting non-rooted segment of understock rose plant stem into a rooting medium with the segment of understock rose plant stem bearing the segment of scion rose plant stem and the at least one leaflet present thereon above the rooting medium, (e) simultaneously forming roots on the end portion of the segment of understock rose plant stem present in the rooting medium with the formation of a graft union between the scion and understock rose plant stem segments at the location of the cut in the understock, and (f) removing a portion of the segment of understock stem above the graft union following the formation of the graft union.

DESCRIPTION OF PREFERRED EMBODIMENTS

The present process differs from classical grafting methods commonly used to propagate rose plants, and offers substantial advantages when compared to prior rose plant propagation techniques.

The process of the present invention is broadly applicable to the propagation of rose plants and is not limited to the utilization of specific scion and understock varieties. Even understocks which are difficult to graft, such as Rosa indica Major, may be successfully utilized in the present process.

It is essential that stem segments initially be obtained from the scion and understock varieties during an active stage of growth. Such stem segments should be relatively young at a juvenile and cellularly active stage of development. Commonly the scion stem segments are aged approximately 40 to 70 days, and commonly the understock stem segments are aged approximately 50 to 90 days. It is also preferable that the stem segments have never encountered a dormancy period. The stem segments need not be as long as those commonly required for prior rose propagation techniques. For instance, the stem segments utilized in the present process conveniently can range from about 6 to 8 cm. in length. The segment ends are not callused.

Figure 1:
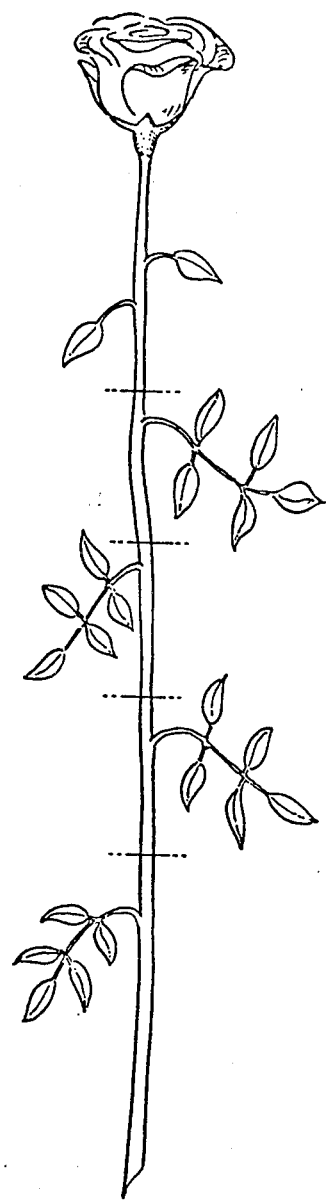
FIG. 1 illustrates a typical scion rose plant stem during an active stage of growth which can serve as a source for segments suitable for use in the present process. A bud is present adjacent the point of attachment for each compound leaf but is not illustrated. The horizontal lines indicate various locations where the stem could conveniently be cut into segments.

It is essential that the segment of scion rose plant stem have at least one bud and at least one leaflet. Preferably, the scion rose plant stem segment possesses a plurality of leaflets so that ample food can be generated to help achieve the desired graft union discussed hereafter. A plurality of buds also can be present upon the segment of scion rose plant stem. See FIGS. 1 and 2.

Figure 3:
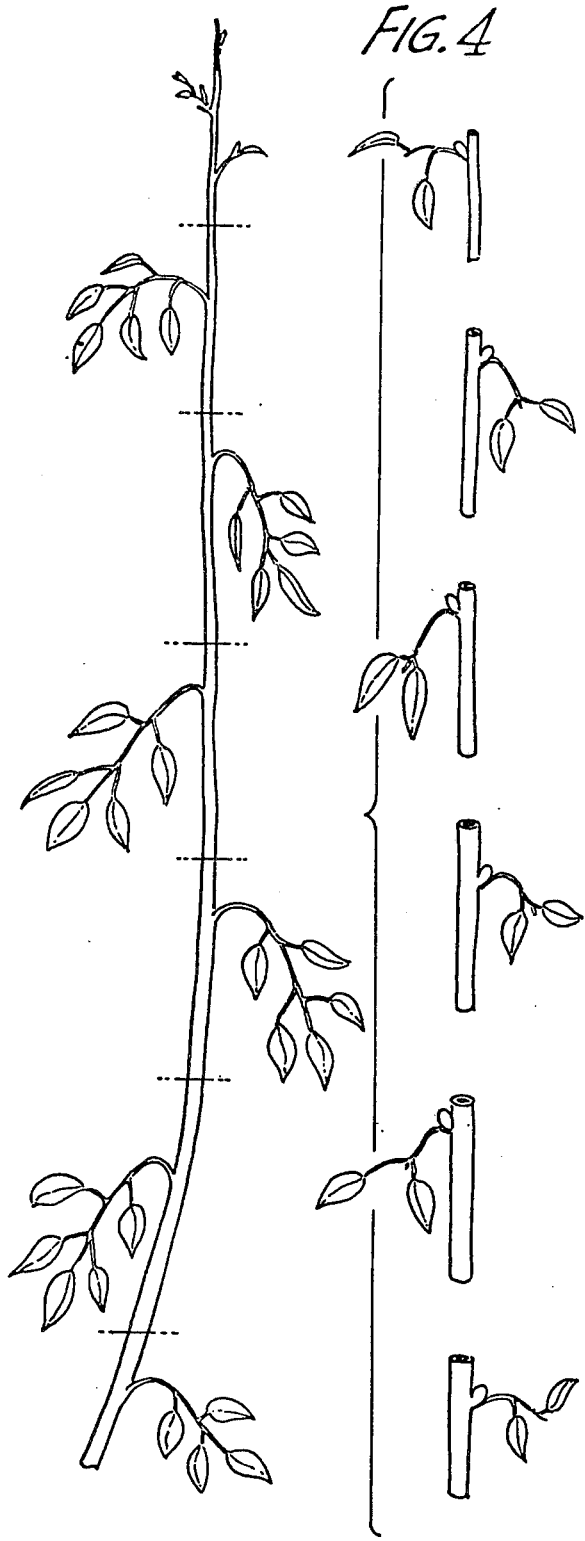
FIG. 3 illustrates a typical understock rose plant stem during an active stage of growth which can serve as a source for segments suitable for use in the present process. A bud is present adjacent the point of attachment for each compound leaf but is not illustrated. The horizontal lines indicate various locations where the stem could conveniently be cut into segments.
Figure 4:
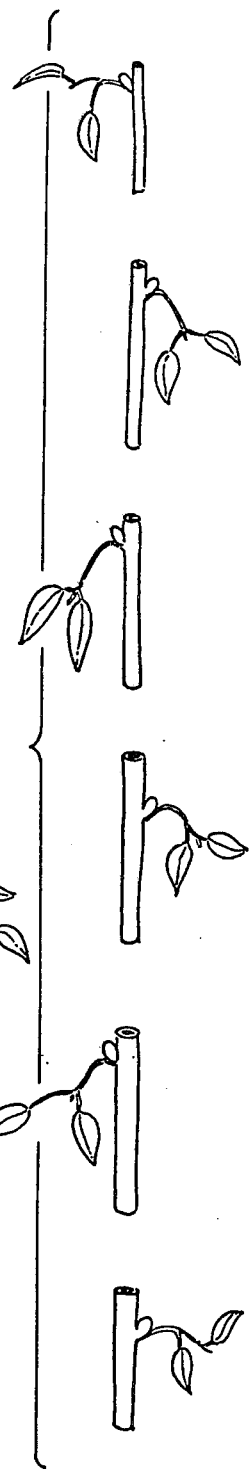
FIG. 4 illustrates a group of non-rooted segments obtained from the understock rose plant stem of FIG. 3 prior to being cut to facilitate placement of the segments of scion rose plant stem of FIG. 2. Buds are illustrated adjacent the point of attachment for each compound leaf. The number of leaflets on each segment has been reduced to two.

The segment of understock rose plant stem initially selected for use in the process is non-rotted and possesses at least one leaf. Preferably the understock rose plant stem segment possesses a plurality of leaflets so that ample food can be generated to help achieve the desired graft union discussed hereafter. Commonly at least one bud is present upon the non-rooted segment of understock rose plant but is not essential. See FIGS. 3 and 4.

A grafting cut which may be diagonally shaped is formed in the non-rooted stem segment of understock rose plant at a location below the leaflet or below the leaflet and bud. The cut should penetrate into the woody part of the stem. Any additional buds below the grafting cut preferably are removed. The cut formed in the non-rooted segment of understock rose plant preferably is disposed so that the scion segment forms an angle of approximately 15 to 50 degrees to the longitudinal axis of the segment of understock rose plant stem with the end of the scion segment being generally upwardly disposed.

Figure 2:
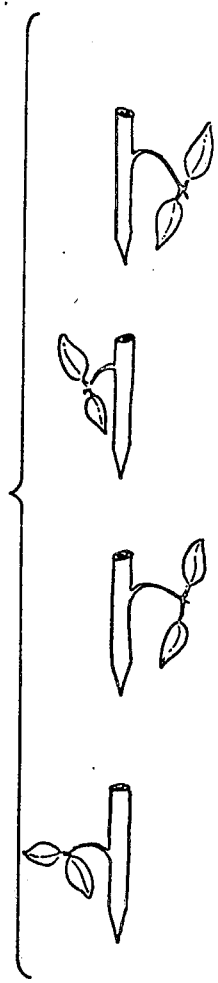
FIG. 2 illustrates a group of doubly beveled segments obtained from the scion rose plant stem of FIG. 1 prior to placement in a cut in a non-rooted segment of an understock rose plant. The number of leaflets on each segment has been reduced to two. Also a bud is present adjacent the point of leaf attachment but is not illustrated.
Figure 5:
FIGS. 5, 6 and 7 illustrate respectively a nonrooted segment of understock rose plant stem complete with leaflets and bud (e.g. of FIG. 4), a scion rose plant stem having a doubly beveled end complete with leaflets and bud (e.g. of FIG. 2), and a resulting composite of segments similar to the foregoing wherein the doubly beveled end of the segment of the scion stem is placed in a cut present in the non-rooted segment of the understock stem.
Figure 6:
Figure 7:
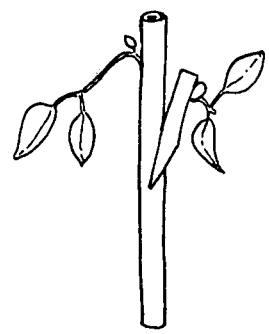

An end of the segment of scion rose plant stem preferably is shaped so as to fit snugly and securely into the graft cut. For instance, the end can be beveled by cutting. The cuttings can be treated with hormones to encourage cellular multiplication. As illustrated in FIGS. 2 and 6, the end preferably is doubly beveled. Once placed or inserted in the graft cut, the scion segment may be held in place by common graft attaching products. FIG. 7 illustrates the insertion of the scion stem segment of FIG. 6 into a graft cut formed in the understock stem segment of FIG. 5.

The end portion of the non-rooted segment of understock rose plant while bearing the segment of scion rose plant stem next is placed in a suitable rooting medium. The previously inserted scion segment is disposed above the rooting medium. Suitable rooting media include those commonly selected for the rooting of rose cuttings and include floral foam, a 50/50 mixture of peat and perlite, etc.

Figure 8:
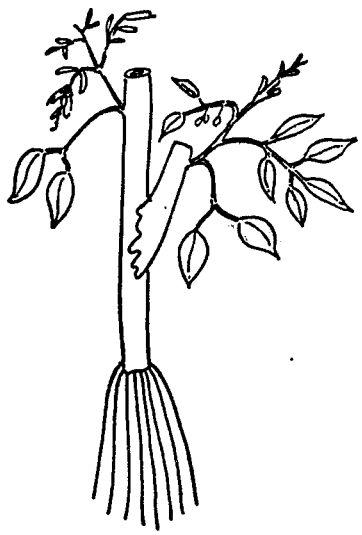
FIG. 8 illustrates the composite of scion and understock segments of FIG. 7 following the simultaneous formation of (1) roots on the end portion of the understock stem when placed in a rooting medium (not shown), and (2) a a graft union between the scion and understock rose plant stem segments. The buds present on each segment also have resulted in new growth at this stage of the process.

While present in the rooting medium roots simultaneously are formed at the end of the understock segment, and a graft union and callus is formed between scion and understock segments at the location of the cut in the understock. See FIG. 8. Such simultaneous formation of rose plant roots and a graft union is a key element in the present process. The stem segments selected are joined at a time in their development when cellular multiplication is rapid, thereby facilitating a quick and perfect graft union as well as a powerful root system development. Since there is no important development of stems and leaves on the understock, a substantial portion of the produced energy is expended to benefit the grafted variety. The simultaneous formation of roots and a graft union preferably is carried out in an environment of increased humidity, such as in a greenhouse, in a fog chamber, under mist, or under a covering of appropriate plastic sheet material.

Figure 9:
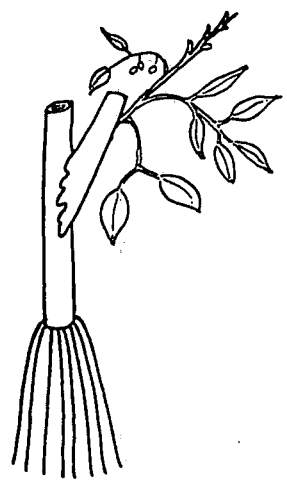
FIG. 9 illustrates the new plant of the scion variety following the removal of a portion of understock stem. Such removal may be conducted before or after transplanting of the new plant of the scion variety.

As illustrated in FIG. 9, a portion of the segment of understock stem above the graft union is removed (i.e. clipped) thereby leaving a new plant of the scion variety. Such removal of a portion of the segment of understock stem may be carried out before or after transplanting. The new plant may be transplanted while the roots are young, active, and protected by the rooting medium which allows the root system to become further established without substantial interruption.

When carrying out the process of the present invention, it is possible to form approximately 200 to 400 new rose plants per square meter of bench area within 5 to 6 weeks. Accordingly, more rose plants can be produced per unit area in a shorter period of time than when following prior rose plant propagation techniques. Shorter stem segments may be employed in the present process than commonly required with prior rose plant propagation techniques. Additionally, the grafting step conveniently can be carried out "on the table" by personnel possessing only minimal prior experience while in a convenient posture.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. An improve rose plant propagation process which can be carried out on an expeditious basis comprising:

(a) providing a segment of a scion rose plant stem having at least one bud and at least one leaflet which was obtained during an active stage of growth, (b) providing a non-rooted segment of an understock rose plant stem having at least one leaflet which was obtained during an active stage of growth, (c) placing an end of said segment of scion rose plant stem into a cut formed in said non-rooted segment of understock rose plant stem at a location below said at least one leaflet, (d) placing an end portion of said resulting non-rooted segment of understock rose plant stem into a rooting medium with said segment of understock rose plant stem bearing said segment of scion rose plant stem and said at least one leaflet present thereon above said rooting medium, (e) simultaneously forming roots on said end portion of said segment of understock rose plant stem present in said rooting medium with the formation of a graft union between said scion and understock rose plant stem segments at the location of said cut in said understock, and (f) removing a portion of said segment of understock stem above said graft union following the formation of said graft union.

2. An improved rose plant propagation process according to claim 1 wherein neither segment of steps (a) and (b) has encountered a dormancy period.

3. An improved rose plant propagation process according to claim 1 wherein said non-rooted segment of understock rose plant stem of step (b) has at least one bud in addition to at least one leaflet, and said at least one bud also is borne above said rooting medium during said step (d).

4. An improved rose plant propagation process according to claim 1 wherein said non-rooted segment of understock rose plant stem in Rosa indica Major.

5. An improved rose plant propagation process according to claim 1 wherein said cut formed in said non-rooted segment of understock rose plant stem is disposed so that the scion segment forms an aangle of approximately 15 to 50 degrees to the longitudinal axis of said segment of understock rose plant stem and is generally upwardly disposed.

6. An improved rose plant propagation process according to claim 1 wherein said end of said segment of scion rose plant stem which is placed into said cut in said non-rooted segment of said understock rose plant stem is doubly beveled.

7. An improved rose plant propagation process according to claim 1 wherein said step (e) is carried out in an environment of increased humidity.

8. An improved rose plant propagation process according to claim 1 wherein said step (f) is carried out following an intermediate transplanting step.

9. An improved rose plant propagation process which can be carried out on an expeditious basis comprising:

(a) providing a segment which has not encountered a dormancy period of a scion rose plant stem having a doubly beveled end and at least one leaflet which was obtained during an active stage of growth, (b) providing a non-rooted segment which has not encountered a dormancy period of a Rosa indica Major understock rose plant stem having at least one bud and at least one leaflet which was obtained during an active stage of growth, (c) placing said doubly beveled end of said segment of scion rose plant stem into a cut formed in said non-rooted segment of understock rose plant stem so that the scion segment forms an angle of approximately 15 to 50 degrees to the longitudinal axis of said understock segment and is generally upwardly disposed at a location below said at least one bud and at least one leaflet of said understock segment, (d) placing an end potion of said resulting non-rooted segment of understock rose plant stem into a rooting medium with said segment of understock rose plant stem bearing said segment of scion rose plant stem and said at least one bud and said at least one leaflet present thereon above said rooting medium, (e) simulaneously forming roots on said end portion of said segment of understock rose plant stem present in said rooting medium with the formation of a graft union between said scion aand understock rose plant stem segments at the location of said cut in said understock while present in an environment of increased humidity, and (f) removing a portion of said segment of understock stem above said graft union following the formation of said graft union.

10. An improved rose plant propagation process according to claim 9 wherein said step (f) is carried out following an intermediate transplanting step.

* * * * *

Dedication 4,154,020.—*Uriel Paz; Moshe Levy;* and *Zwy Levy,* Havazelet Hasharon, Israel. PROCESS FOR THE PROPAGATION OF ROSE PLANTS. Patent dated May 15, 1976. Dedication filed Dec. 28, 1981, by the assignee, *The Conard-Pyle Co.*

Hereby dedicates to the People of the United States of America the remaining term of said patent.

[*Official Gazette September 14, 1982.*]